(12) United States Patent
Mellet et al.

(10) Patent No.: US 8,758,187 B2
(45) Date of Patent: Jun. 24, 2014

(54) MULTI-SPEED TRANSMISSION

(75) Inventors: Edward W. Mellet, Rochester Hills, MI (US); James M. Hart, Belleville, MI (US); Andrew W. Phillips, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 165 days.

(21) Appl. No.: 13/366,843

(22) Filed: Feb. 6, 2012

(65) Prior Publication Data

US 2013/0203546 A1 Aug. 8, 2013

(51) Int. Cl.
*F16H 3/66* (2006.01)

(52) U.S. Cl.
USPC .......................................... 475/280; 475/288

(58) Field of Classification Search
USPC .................. 475/275–291, 296, 330
See application file for complete search history.

(56) References Cited

U.S. PATENT DOCUMENTS

| | | |
|---|---|---|
| 6,176,803 B1 | 1/2001 | Meyer et al. |
| 6,342,026 B1 | 1/2002 | Takagi et al. |
| 6,547,688 B2 | 4/2003 | Takagi et al. |
| 6,558,287 B2 | 5/2003 | Hayabuchi et al. |
| 6,634,980 B1 | 10/2003 | Ziemer |
| 6,663,528 B1 | 12/2003 | Haka |
| 6,736,751 B1 | 5/2004 | Usoro et al. |
| 6,743,139 B1 | 6/2004 | Usoro et al. |
| 6,743,140 B1 | 6/2004 | Lee et al. |
| 6,743,142 B1 | 6/2004 | Lee et al. |
| 6,743,143 B1 | 6/2004 | Usoro et al. |
| 6,743,144 B1 | 6/2004 | Lee et al. |
| 6,746,357 B1 | 6/2004 | Usoro et al. |
| 6,752,736 B1 | 6/2004 | Lee et al. |
| 6,755,765 B2 | 6/2004 | Usoro et al. |
| 6,758,784 B2 | 7/2004 | Lee et al. |
| 6,758,787 B2 | 7/2004 | Usoro et al. |
| 6,764,424 B1 | 7/2004 | Usoro et al. |
| 6,764,425 B2 | 7/2004 | Lee et al. |
| 6,764,426 B2 | 7/2004 | Usoro et al. |
| 6,767,307 B1 | 7/2004 | Lee et al. |
| 6,802,795 B2 | 10/2004 | Miyazaki et al. |
| 6,811,512 B2 | 11/2004 | Usoro et al. |
| 6,837,823 B2 | 1/2005 | Lee et al. |
| 6,852,059 B2 | 2/2005 | Lee et al. |
| 6,960,149 B2 | 11/2005 | Ziemer |
| 6,984,187 B2 | 1/2006 | Biermann |
| 6,991,578 B2 | 1/2006 | Ziemer |
| 7,011,597 B2 | 3/2006 | Haka |

(Continued)

FOREIGN PATENT DOCUMENTS

| | | |
|---|---|---|
| JP | 2000120822 A | 4/2000 |
| JP | 2003194207 A | 7/2003 |
| JP | 2006097830 A | 4/2006 |

OTHER PUBLICATIONS

U.S. Appl. No. 13/206,862, filed Aug. 8, 2011, by Mellet et al. All pages.

*Primary Examiner* — Roger Pang

(57) ABSTRACT

A transmission is provided having an input member, an output member, at least four planetary gear sets, a plurality of coupling members and a plurality of torque transmitting devices. Each of the planetary gear sets includes first, second and third members. The torque transmitting devices include clutches and brakes actuatable in combinations of two to establish at least nine forward gear ratios and one reverse gear ratio.

11 Claims, 3 Drawing Sheets

(56) References Cited

U.S. PATENT DOCUMENTS

| | | |
|---|---|---|
| 7,014,589 B2 | 3/2006 | Stevenson |
| 7,018,319 B2 | 3/2006 | Ziemer |
| 7,101,305 B2 | 9/2006 | Tabata et al. |
| 7,128,683 B2 | 10/2006 | Oguri et al. |
| 7,163,484 B2 | 1/2007 | Klemen |
| 2005/0090362 A1 | 4/2005 | Abe et al. |
| 2006/0019791 A1 | 1/2006 | Baldwin |
| 2006/0270513 A1 | 11/2006 | Klemen |
| 2006/0270514 A1 | 11/2006 | Oguri et al. |
| 2006/0270516 A1 | 11/2006 | Klemen |
| 2013/0040776 A1* | 2/2013 | Mellet et al. .............. 475/275 |

* cited by examiner

| GEAR STATE | GEAR RATIO | RATIO STEP | TORQUE TRANSMITTING ELEMENTS ||||||
|---|---|---|---|---|---|---|---|---|
| | | | 32 | 30 | 34 | 36 | 28 | 26 |
| REV | -3.917 | | X | | | | | X |
| N | | -0.68 | | | | | | |
| 1ST | 5.775 | | X | | X | | | |
| 2ND | 4.176 | 1.38 | X | | | X | | |
| 3RD | 3.209 | 1.30 | | X | X | | | |
| 4TH | 2.320 | 1.38 | | X | | X | | |
| 5TH | 1.939 | 1.20 | | | | X | | X |
| 6TH | 1.575 | 1.23 | | | | | X | X |
| 7TH | 1.368 | 1.15 | | | | X | X | |
| 8TH | 1.254 | 1.09 | | | | | X | X |
| 9TH | 1.000 | 1.25 | | | | | X | X |
| 10TH | 0.797 | 1.26 | | X | | | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||||
|---|---|---|---|---|---|---|---|---|
| | | | 132 | 130 | 134 | 136 | 128 | 126 |
| REV | -2.940 | | X | | | | | X |
| N | | -0.51 | | | | | | |
| 1ST | 5.786 | | X | | X | | | |
| 2ND | 4.115 | 1.41 | X | | | X | | |
| 3RD | 3.547 | 1.16 | | X | X | | | |
| 4TH | 2.523 | 1.41 | | X | | X | | |
| 5TH | 2.014 | 1.25 | | | X | | | X |
| 6TH | 1.637 | 1.23 | | | | X | | X |
| 7TH | 1.446 | 1.13 | | | X | | X | |
| 8TH | 1.313 | 1.10 | | | | X | X | |
| 9TH | 1.000 | 1.31 | | | | | X | X |
| 10TH | 0.746 | 1.34 | X | | | | X | |

X = ON - ENGAGED CARRYING TORQUE
O = ON - ENGAGED NOT CARRYING TORQUE

MULTI-SPEED TRANSMISSION

FIELD

The invention relates generally to a multiple speed transmission, and more particularly, to a transmission having a plurality speeds, planetary gear sets, and torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and brakes.

In one embodiment, a transmission has an input member, an output member, first, second, third and fourth planetary gear sets each having first second and third members, five interconnecting members, and six torque transmitting mechanisms. The first interconnecting member continuously interconnects the third member of the first planetary gear set with the second member of the fourth planetary gear set. The second interconnecting member continuously interconnects the second member of the first planetary gear set with the third member of the third planetary gear set. The third interconnecting member continuously interconnects the first member of the first planetary gear set with the third member of the second planetary gear set. The fourth interconnecting member continuously interconnects the second member of the second planetary gear set with the second member of the third planetary gear set. The fifth interconnecting member continuously interconnects the first member of the second planetary gear set with the third member of the fourth planetary gear set. The six torque transmitting mechanisms are each selectively engageable to interconnect at least one of the first, second, and third members with at least one other of the first, second, third members and a stationary member. The six torque transmitting mechanisms are selectively engageable in combinations of at least two to establish at least nine forward speed ratios and at least one reverse speed ratio between the input member and the output member.

In one variation, a transmission includes a stationary member, at least four planetary gear sets (each having a sun gear, a carrier member, and a ring gear), an input member continuously connected for common rotation with the second sun gear and fourth sun gear, an output member continuously connected for common rotation with the first carrier member and the third ring gear, five interconnecting members, two clutches, and four brakes. The first interconnecting member continuously interconnects the first sun gear with the fourth carrier member. The second interconnecting member continuously interconnects the first carrier member with the third ring gear. The third interconnecting member continuously interconnects the first ring gear with the second ring gear. The fourth interconnecting member continuously interconnects the second carrier member with the third carrier member. The first clutch is selectively engageable to interconnect the third sun gear with the input member, the second sun gear, and the fourth sun gear. The second clutch is selectively engageable to interconnect the second carrier member and the third carrier member with the input member, the second sun gear, and the fourth sun gear. The first brake is selectively engageable to interconnect the third sun gear with the stationary member. The second brake is selectively engageable to interconnect the third carrier member and the second carrier member with the stationary member. The third brake is selectively engageable to interconnect the first sun gear and the fourth carrier member with the stationary member. The fourth brake is selectively engageable to interconnect the fourth ring gear with the stationary member. The six torque transmitting mechanisms are selectively engageable in combinations of at least two to establish at least nine forward speed ratios and at least one reverse speed ratio between the input member and the output member.

In another embodiment, a transmission includes an input member, an output member, four planetary gear sets (each having a sun gear, a carrier member, and a ring gear), five interconnecting members, and six torque transmitting mechanisms. The first interconnecting member continuously interconnects the first ring gear with the second carrier member. The second interconnecting member continuously interconnects the first carrier member with the third ring gear and the output member. The third interconnecting member continuously interconnects the first sun gear with the fourth carrier member. The fourth interconnecting member continuously interconnects the second sun gear with the fourth sun gear and the input member. The fifth interconnecting member continuously interconnects the second ring gear with the third carrier member. The six torque transmitting mechanisms are each selectively engageable to interconnect at least one of the sun gears, carrier members, and ring gears with at least one other of the sun gears, carrier members, ring gears and a stationary member. The six torque transmitting mechanisms are selectively engageable in combinations of at least two to establish at least nine forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In some forms of the present disclosure, a nine or ten speed transmission is provided in a relatively small package by achieving nine or ten forward speeds with four planetary gear sets, four brakes, and two clutches. In other variations, however, additional brakes, clutches, planetary gear sets, or other components may be added.

At the outset, it should be appreciated that the embodiments of the nine or ten speed automatic transmissions of the present invention have an arrangement of permanent mechanical connections between the elements of the four planetary gear sets. In one embodiment, a first component or element of a first planetary gear set is permanently coupled to a third component or element of a second planetary gear set. A second component or element of the first planetary gear set is permanently coupled to a third component or element of a third planetary gear set. A third component or element of the first planetary gear set is permanently coupled to a second component or element of a fourth planetary gear set. A second component or element of the second planetary gear set is permanently coupled to a second component or element of the third planetary gear set. A first component or element of the second planetary gear set is permanently coupled to a third component or element of the fourth planetary gear set.

In another embodiment, a first component or element of a first planetary gear set is permanently coupled to a second component or element of a second planetary gear set. A second component or element of the first planetary gear set is permanently coupled to a third component or element of a third planetary gear set. A third component or element of the first planetary gear set is permanently coupled to a second component or element of a fourth planetary gear set. A first component or element of a second planetary gear set is permanently coupled to a third component or element of the fourth planetary gear set. A third component or element of the second planetary gear set is permanently coupled to a second component or element of the third planetary gear set.

Figure 1:
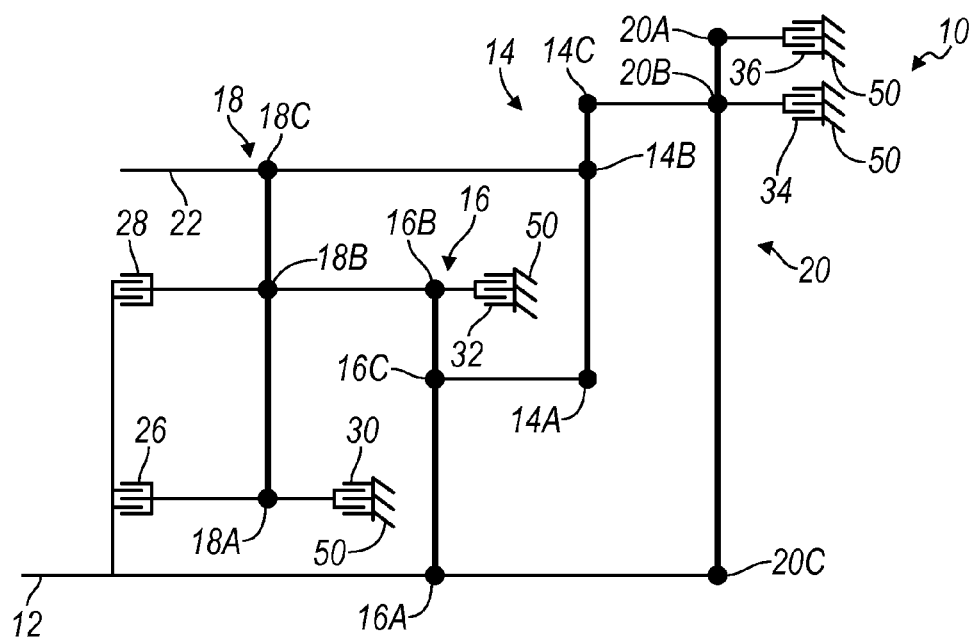
FIG. 1 is a lever diagram of an embodiment of a transmission according to the principles of present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 16A of the second planetary gear set 16 and the third node 20C of the fourth planetary gear set 20. The output member 22 is coupled to the third node 18C of the third planetary gear set 18 and the second node 14B of the first planetary gear set 14. The first node 14A of the first planetary gear set 14 is coupled to the third node 16C of the second planetary gear set 16. The second node 14B of the first planetary gear set 14 is coupled to the third node 18C of the third planetary gear set 18. The third node 14C of the first planetary gear set 14 is coupled to the second node 20B of the fourth planetary gear set 20. The second node 16B of the second planetary gear set 16 is coupled to second node 18B of the third planetary gear set 18.

A first clutch 26 selectively connects the input member or shaft 12, the first node 16A of the second planetary gear set 16 and the third node 20C of the fourth planetary gear set 20 with the first node 18A of the third planetary gear set 18. A second clutch 28 selectively connects the input member or shaft 12, the first node 16A of the second planetary gear set 16, and the third node 20C of the fourth planetary gear set 20 with the second node 18B of the third planetary gear set 18 and the second node 16B of the second planetary gear set 16. A first brake 30 selectively connects the first node 18A of the third planetary gear set 18 with a stationary member or transmission housing 50. A second brake 32 selectively connects the second node 16B of the second planetary gear set 16 and the second node 18B of the third planetary gear set 18 with the stationary member or transmission housing 50. A third brake 34 selectively connects the third node 14C of the first planetary gear set 14 and the second node 20B of the fourth planetary gear set 20 with the stationary member or transmission housing 50. A fourth brake 36 selectively connects the first node 20A of the fourth planetary gear set 20 with the stationary member or transmission housing 50.

Figure 2:
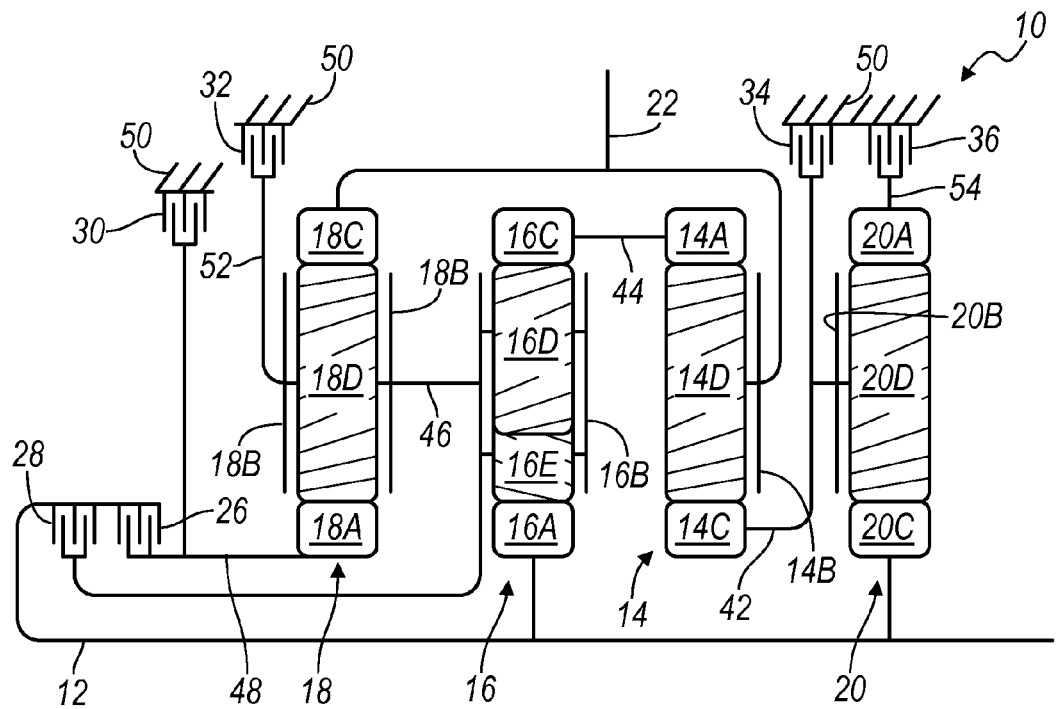
FIG. 2 is a diagrammatic illustration of the transmission of FIG. 1 according to the principles of the present invention.

Referring now to FIG. 2, a stick diagram presents a schematic layout of an embodiment of the ten speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a first sun gear member 14C, a first ring gear member 14A, and a first planet gear carrier member 14B that rotatably supports a first set of planet gears 14D (only one of which is shown). The first planetary gear set 14 is a simple planetary gear set in this variation, but in other variations of the present invention, the first planetary gear set 14 could be a compound planetary gear set. The first sun gear member 14C is connected for common rotation with a first shaft or interconnecting member 42. The first ring gear member 14A is connected for common rotation with a second shaft or interconnecting member 44. The first planet carrier member 14B is connected for common rotation with the output shaft or member 22. The first planet gears 14D are each configured to intermesh with both the first sun gear member 14C and the first ring gear member 14A.

The second planetary gear set 16 includes a second sun gear member 16A, a second ring gear member 16C, and a second planet gear carrier member 16B that rotatably supports two second sets of planet gears: a second large set of planetary gears 16D and a second small set of planetary gears 16E (only one of each is shown). In other words, the second planetary gear set 16 is a compound planetary gear set in this variation, but in other variations of the present invention, the second planetary gear set 16 could be a simple planetary gear set. The second sun gear member 16A is connected for common rotation with the input shaft or member 12. The second planet carrier member 16B is connected for common rotation with a third shaft or interconnecting member 46. The second ring gear member 16C is connected for common rotation with the second shaft or interconnecting member 44. The second large set of planet gears 16D are each configured to intermesh with both the second ring gear member 16C and the second small set of planet gears 16E. The second small set of planet gears 16E are each configured to intermesh with both the second sun gear member 16A and the second large set of planet gears 16D.

The third planetary gear set 18 includes a third sun gear member 18A, a third ring gear member 18C, and a third planet gear carrier member 18B that rotatably supports a third set of planet gears 18D (only one of which is shown). In other words, the third planetary gear set 18 is a simple planetary gear set in this variation, but in other variations of the present invention, the third planetary gear set 18 could be a compound planetary gear set. The third sun gear member 18A is connected for common rotation with a fourth shaft or interconnecting member 48. The third planet carrier member 18B is connected for common rotation with the third shaft or interconnecting member 46 and a fifth shaft or interconnecting member 52. The third ring gear member 18C is connected for common rotation with the output shaft or member 22. The third planet gears 18D are each configured to intermesh with both the third sun gear member 18A and the third ring gear member 18C.

The fourth planetary gear set 20 includes a fourth sun gear member 20C, a fourth ring gear member 20A, and a fourth planet gear carrier member 20B that rotatably supports a fourth set of planet gears 20D (only one of which is shown). In other words, the fourth planetary gear set 20 is a simple planetary gear set in this variation, but in other variations of the present invention, the fourth planetary gear set 20 could be a compound planetary gear set. The fourth planet gear carrier member 20B is connected for common rotation with the first shaft or interconnecting member 42. The fourth ring gear member 20A is connected for common rotation with a sixth shaft or interconnecting member 54. The fourth sun gear member 20C is connected for common rotation with the input shaft or member 12. The fourth planet gears 20D are each configured to intermesh with both the fourth sun gear member 20C and the fourth ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first and second clutches 26, 28 and the first, second, third, and fourth brakes 30, 32, 34 and 36 allow for selective interconnection of the shafts or interconnecting members 42, 44, 46, 48, 52, 54, members of the planetary gear sets 14A-C, 16A-C, 18A-C, 20A-C, and the housing 50.

For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The first brake 30 is selectively engageable to connect the fourth shaft or interconnecting member 48 with the stationary element or the transmission housing 50 in order to restrict the member 48 from rotating relative to the transmission housing 50. The second brake 32 is selectively engageable to connect the fifth shaft or interconnecting member 52 with the stationary element or the transmission housing 50 in order to restrict the member 52 from rotating relative to the transmission housing 50. The third brake 34 is selectively engageable to connect the first shaft or interconnecting member 42 with the stationary element or the transmission housing 50 in order to restrict the member 42 from rotating relative to the transmission housing 50. The fourth brake 36 is selectively engageable to connect the sixth shaft or interconnecting member 54 with the stationary element or the transmission housing 50 in order to restrict the member 54 from rotating relative to the transmission housing 50. In turn, the gear elements connected to each of the connecting members are also connected or restricted accordingly.

Figures 3, 4:
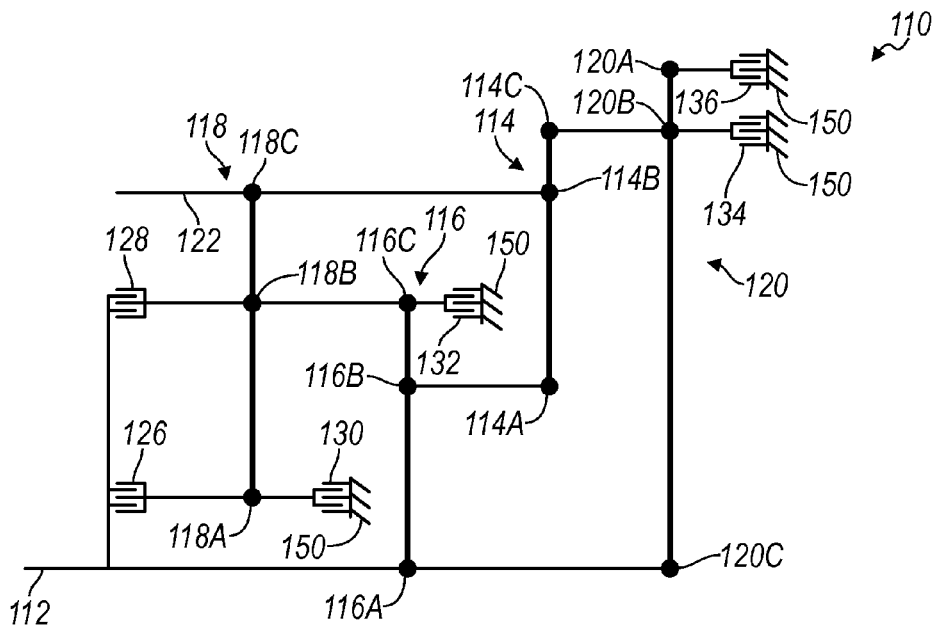
FIG. 3 is a truth table presenting an example of a state of engagement of various torque transmitting elements in forward and reverse speeds or gear ratios of the transmission illustrated in FIGS. 1-2.
FIG. 4 is a lever diagram of another embodiment of a transmission according to the principles of the present invention.

Referring now to FIG. 2 and FIG. 3, the operation of the embodiment of the transmission 10 will be described. It will be appreciated that transmission 10 is capable of transmitting torque from the input shaft or member 12 to the output shaft or member 22 in nine, ten, or more forward speed torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. An "O" in the box means that a particular clutch or brake is engaged but not carrying torque (no "O's" are present in FIG. 3). Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the first clutch 26 and the second brake 32 are engaged or activated. The first clutch 26 connects the input shaft or member 12 with the fourth shaft or interconnecting member 48. The second brake 32 connects the fifth shaft or interconnecting member 52 with the stationary element or the transmission housing 50 in order to restrict the member 52 from rotating relative to the transmission housing 50, which restricts the second and third planetary carriers 16B, 18B from rotating relative to the transmission housing 50. Likewise, ten forward ratios are achieved through different combinations of clutch and brake engagement, as shown in FIG. 3.

Referring now to FIG. 4, another embodiment of a ten speed transmission 110 is illustrated in a lever diagram format. The transmission 110 includes an input shaft or member 112, a first planetary gear set 114, a second planetary gear set 116, a third planetary gear set 118, a fourth planetary gear set 120, and an output shaft or member 122. Like the lever diagram of FIG. 1, in the lever diagram of FIG. 4, each of the planetary gear sets 114, 116, 118, 120 have first, second, and third nodes 114A-C, 116A-C, 118A-C, 120A-C.

The input member 112 is continuously coupled to the first node 116A of the second planetary gear set 116 and the third node 120C of the fourth planetary gear set 120. The output member 122 is continuously coupled to the third node 118C of the third planetary gear set 118 and the second node 114B of the first planetary gear set 114. The first node 114A of the first planetary gear set 114 is coupled to the second node 116B of the second planetary gear set 116. The second node 114B of the first planetary gear set 114 is coupled to the third node 118C of the third planetary gear set 118. The third node 114C of the first planetary gear set 114 is coupled to the second node 120B of the fourth planetary gear set 120. The third node 116C of the second planetary gear set 116 is coupled to second node 118B of the third planetary gear set 118.

A first clutch 126 selectively connects the input member or shaft 112, the first node 116A of the second planetary gear set 116, and the third node 120C of the fourth planetary gear set 120 with the first node 118A of the third planetary gear set 118. A second clutch 128 selectively connects the input member or shaft 112, the first node 116A of the second planetary gear set 116, and the third node 120C of the fourth planetary gear set 120 with the second node 118B of the third planetary gear set 118 and the third node 116C of the second planetary gear set 116.

A first brake 130 selectively connects the first node 118A of the third planetary gear set 118 with a stationary member or transmission housing 150. A second brake 132 selectively connects the third node 116C of the second planetary gear set 116 and the second node 118B of the third planetary gear set 118 with the stationary member or transmission housing 150. A third brake 134 selectively connects the third node 114C of the first planetary gear set 114 and the second node 120B of the fourth planetary gear set 120 with the stationary member or transmission housing 150. A fourth brake 136 selectively connects the first node 120A of the fourth planetary gear set 120 with the stationary member or transmission housing 150.

Figures 5, 6:
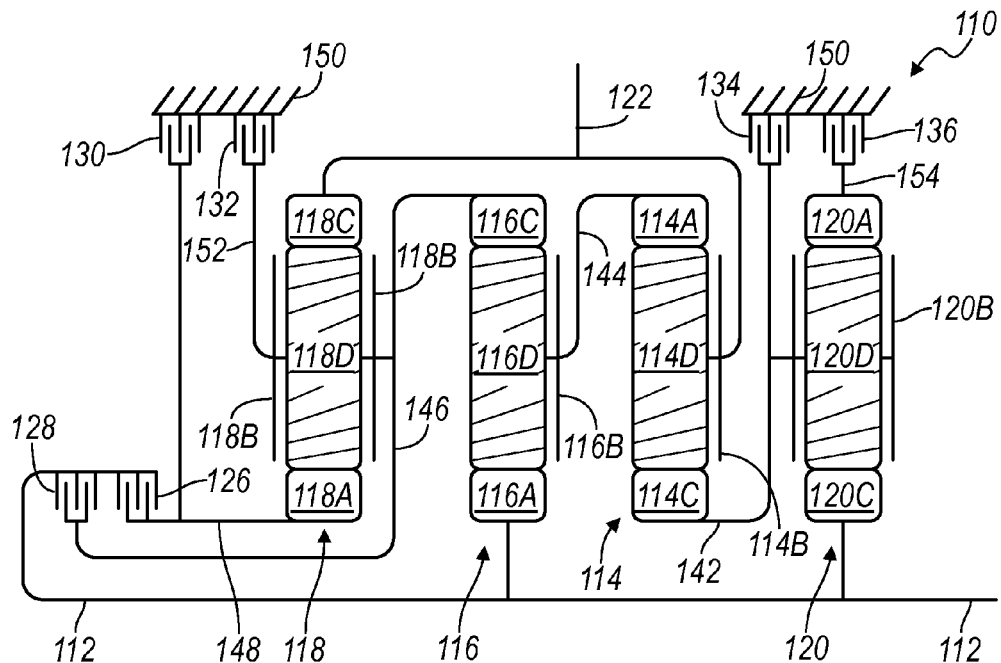
FIG. 5 is a diagrammatic illustration of the transmission of FIG. 4 according to the principles of the present invention.
FIG. 6 is a truth table presenting an example of a state of engagement of various torque transmitting elements in forward and reverse speeds or gear ratios of the transmission illustrated in FIGS. 4-5.

Referring now to FIG. 5, a stick diagram presents a schematic layout of an embodiment of the ten speed transmission 110 of FIG. 4, according to one form of the present invention. It should be understood that alternatively, other different stick diagrams could be used in conjunction with the lever diagram FIG. 4. In FIG. 5, the numbering from the lever diagram of FIG. 4 is carried over. The clutches and couplings are correspondingly presented whereas the nodes of the planetary gear sets now appear as components of planetary gear sets such as sun gears, ring gears, planet gears and planet gear carriers.

For example, like the stick diagram in FIG. 2, the stick diagram in FIG. 5 includes a first, second, third, and fourth planetary gear sets 114, 116, 118, 120, wherein each includes a sun gear member 114C, 116A, 118A 120D, a planet carrier member 114B, 116B, 118B, 120B having planet gears 114D, 116D, 118D, 120D, and a ring gear member 114A, 116C, 118C, 120A. The planet gears 114D, 116D, 118D, 120D intermesh with both a sun gear member 114C, 116A, 118A 120D and a ring gear member 114A, 116C, 118C, 120A, respectively. Each of the planetary gear sets 114, 116, 118, 120 are simple planetary gear sets in this variation, but in other variations of the present invention, one or more of the planetary gear sets 114, 116, 118, 120 could be compound planetary gear sets. The input shaft or member 112 is continuously connected to an input source, and the output shaft or member 122 is continuously connected with another output.

The first sun gear member 114C is connected for common rotation with a first shaft or interconnecting member 142. The first ring gear member 114A is connected for common rotation with a second shaft or interconnecting member 144. The first planet carrier member 114B is connected for common rotation with the output shaft or member 122.

The second sun gear member 116A is connected for common rotation with the input shaft or member 112. The second ring gear member 116C is connected for common rotation with a third shaft or interconnecting member 146. The second planet carrier member 116B is connected for common rotation with the second shaft or interconnecting member 144.

The third sun gear member 118A is connected for common rotation with a fourth shaft or interconnecting member 148. The third ring gear member 118C is connected for common rotation with the output shaft or member 122. The third planet carrier member 118B is connected for common rotation with the third shaft or interconnecting member 146 and a fifth shaft or interconnecting member 152.

The fourth planet gear carrier member 120B is connected for common rotation with the first shaft or interconnecting member 142. The fourth ring gear member 120A is connected for common rotation with a sixth shaft or interconnecting member 154. The fourth sun gear member 120C is connected for common rotation with the input shaft or member 112.

The torque-transmitting mechanisms, including the first and second clutches 126, 128 and the first, second, third, and fourth brakes 130, 132, 134 and 136 allow for selective interconnection of the shafts or interconnecting members, members of the planetary gear sets and the housing. For example, the first clutch 126 is selectively engageable to connect the input shaft or member 112 with the fourth shaft or interconnecting member 148. The second clutch 128 is selectively engageable to connect the input shaft or member 112 with the third shaft or interconnecting member 146. The first brake 130 is selectively engageable to connect the fourth shaft or interconnecting member 148 with the stationary element or the transmission housing 150. The second brake 132 is selectively engageable to connect the fifth shaft or interconnecting member 152 with the stationary element or the transmission housing 150. The third brake 134 is selectively engageable to connect the first shaft or interconnecting member 142 with the stationary element or the transmission housing 150. The fourth brake 136 is selectively engageable to connect the sixth shaft or interconnecting member 154 with the stationary element or the transmission housing 150.

Referring now to FIGS. 5-6, the operation of the illustrated embodiment of the transmission 110 will be described. The transmission 110 is capable of transmitting torque from the input shaft or member 112 to the output shaft or member 122 in nine, ten, or more forward speed torque ratios and at least one reverse speed or torque ratio. Each forward and reverse speed or torque ratio is attained by engagement of one or more of the torque-transmitting mechanisms (i.e. first clutch 126, second clutch 128, first brake 130, second brake 132, third brake 134 and fourth brake 136), as will be explained below.

Like FIG. 3, FIG. 6 is a truth table presenting the various combinations of torque-transmitting mechanisms that are activated or engaged to achieve the various gear states, except that FIG. 6 corresponds to the transmission 110 of FIGS. 4-5 instead of the transmission 10 of FIGS. 1-2. Actual numerical gear ratios of the various gear states are also presented although it should be appreciated that these numerical values are exemplary only and that they may be adjusted over significant ranges to accommodate various applications and operational criteria of the transmission 110. Of course, other gear ratios are achievable depending on the gear diameter, gear teeth count and gear configuration selected.

For example to establish a reverse gear, the first clutch 126 and the second brake 132 are engaged or activated. The first clutch 126 connects the input shaft or member 112 with the fourth shaft or interconnecting member 148. The second brake 132 connects the fifth shaft or interconnecting member 152 with the stationary element or the transmission housing 150 in order to restrict the member 152 from rotating relative to the transmission housing 150, which also restricts the third planetary carrier member 18B and the second ring gear 16C from rotating relative to the transmission housing 150. Likewise, ten forward ratios may be achieved through different combinations of clutch and brake engagement, as shown in FIG. 6.

It will be appreciated that the foregoing explanation of operation and gear states of the transmissions 10, 110 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
an input member;
an output member;
first, second, third and fourth planetary gear sets each having first second and third members;
a first interconnecting member continuously interconnecting the third member of the first planetary gear set with the second member of the fourth planetary gear set;
a second interconnecting member continuously interconnecting the second member of the first planetary gear set with the third member of the third planetary gear set;
a third interconnecting member continuously interconnecting the first member of the first planetary gear set with the third member of the second planetary gear set;
a fourth interconnecting member continuously interconnecting the second member of the second planetary gear set with the second member of the third planetary gear set;
a fifth interconnecting member continuously interconnecting the first member of the second planetary gear set with the third member of the fourth planetary gear set; and
six torque transmitting mechanisms each selectively engageable to interconnect at least one of the first, second, and third members with at least one other of the first, second, third members and a stationary member,
wherein the six torque transmitting mechanisms are selectively engageable in combinations of at least two to establish at least nine forward speed ratios and at least one reverse speed ratio between the input member and the output member,
wherein the input member is continuously connected for common rotation with the third member of the fourth planetary gear set and the first member of the second planetary gear set,
wherein the output member is continuously connected for common rotation with the second member of the first planetary gear set and the third member of the third planetary gear set, and
wherein the third member of the first planetary gear set, the third member of the fourth planetary gear set, the first member of the second planetary gear set, and the first member of the third planetary gear set are sun gears; wherein the second members of the first, second, third, and fourth planetary gear sets are carrier members; and wherein the first member of the first planetary gear set, the first member of the fourth planetary gear set, the third member of the second planetary gear set, and the third member of the third planetary gear set are ring gears.

2. The transmission of claim 1 wherein the second planetary gear set is a compound planetary gear set, and wherein the first, third, and fourth planetary gear sets are simple planetary gear sets.

3. A transmission comprising:
a stationary member;
a first planetary gear set having a first sun gear, a first carrier member, and a first ring gear;
a second planetary gear set having a second sun gear, a second carrier member, and a second ring gear;
a third planetary gear set having a third sun gear, a third carrier member, and a third ring gear;
a fourth planetary gear set having a fourth sun gear, a fourth carrier member, and a fourth ring gear;
an input member continuously connected for common rotation with the second sun gear and fourth sun gear;
an output member continuously connected for common rotation with the first carrier member and the third ring gear;
a first interconnecting member continuously interconnecting the first sun gear with the fourth carrier member;
a second interconnecting member continuously interconnecting the first carrier member with the third ring gear;
a third interconnecting member continuously interconnecting the first ring gear with the second ring gear;
a fourth interconnecting member continuously interconnecting the second carrier member with the third carrier member;
a first clutch selectively engageable to interconnect the third sun gear with the input member, the second sun gear, and the fourth sun gear;
a second clutch selectively engageable to interconnect the second carrier member and the third carrier member with the input member, the second sun gear, and the fourth sun gear;
a first brake selectively engageable to interconnect the third sun gear with the stationary member;
a second brake selectively engageable to interconnect the third carrier member and the second carrier member with the stationary member;
a third brake selectively engageable to interconnect the first sun gear and the fourth carrier member with the stationary member; and a fourth brake selectively engageable to interconnect the fourth ring gear with the stationary member, wherein the six torque transmitting mechanisms are selectively engageable in combinations of at least two to establish at least nine forward speed ratios and at least one reverse speed ratio between the input member and the output member.

4. A transmission comprising:

an input member;

an output member;

a first planetary gear set having a first sun gear, a first carrier member, and a first ring gear;

a second planetary gear set having a second sun gear, a second carrier member, and a second ring gear;

a third planetary gear set having a third sun gear, a third carrier member, and a third ring gear;

a fourth planetary gear set having a fourth sun gear, a fourth carrier member, and a fourth ring gear;

a first interconnecting member continuously interconnecting the first ring gear with the second carrier member;

a second interconnecting member continuously interconnecting the first carrier member with the third ring gear and the output member;

a third interconnecting member continuously interconnecting the first sun gear with the fourth carrier member;

a fourth interconnecting member continuously interconnecting the second sun gear with the fourth sun gear and the input member;

a fifth interconnecting member continuously interconnecting the second ring gear with the third carrier member; and six torque transmitting mechanisms each selectively engageable to interconnect at least one of the sun gears, carrier members, and ring gears with at least one other of the sun gears, carrier members, ring gears and a stationary member, and wherein the six torque transmitting mechanisms are selectively engageable in combinations of at least two to establish at least nine forward speed ratios and at least one reverse speed ratio between the input member and the output member.

5. The transmission of claim 4 wherein a first of the six torque transmitting mechanisms is selectively engageable to interconnect the third sun gear with the input member, the second sun gear, and the fourth sun gear.

6. The transmission of claim 5 wherein a second of the six torque transmitting mechanisms is selectively engageable to interconnect the second ring gear and the third carrier member with the input member, the second sun gear, and the fourth sun gear.

7. The transmission of claim 6 wherein a third of the six torque transmitting mechanisms is selectively engageable to interconnect the third sun gear with the stationary member.

8. The transmission of claim 7 wherein a fourth of the six torque transmitting mechanisms is selectively engageable to interconnect the third carrier member and the second ring gear with the stationary member.

9. The transmission of claim 8 wherein a fifth of the six torque transmitting mechanisms is selectively engageable to interconnect the first sun gear and the fourth carrier member with the stationary member.

10. The transmission of claim 9 wherein a sixth of the six torque transmitting mechanisms is selectively engageable to interconnect the fourth ring gear with the stationary member.

11. The transmission of claim 10 wherein the first, second, third and fourth planetary gear sets are simple planetary gear sets.

* * * * *